June 30, 1931.    J. ECKHARD    1,812,519
FLUID OR HYDRAULIC SHOCK ABSORBER
Filed Oct. 31, 1929    3 Sheets-Sheet 1

Inventor
John Eckhard
By Murray and Zugelter
Attorneys

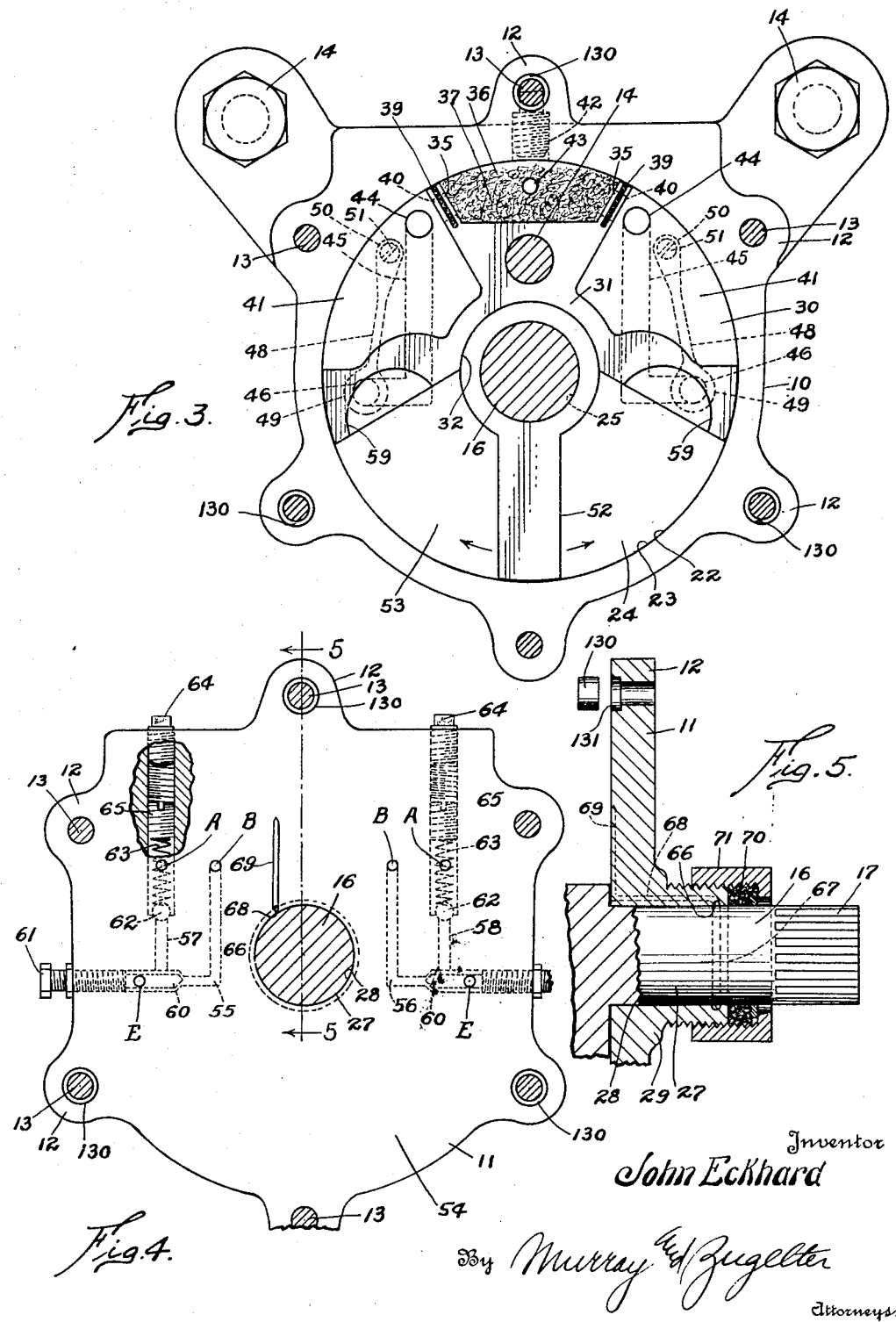

June 30, 1931. J. ECKHARD 1,812,519
FLUID OR HYDRAULIC SHOCK ABSORBER
Filed Oct. 31, 1929 3 Sheets-Sheet 3
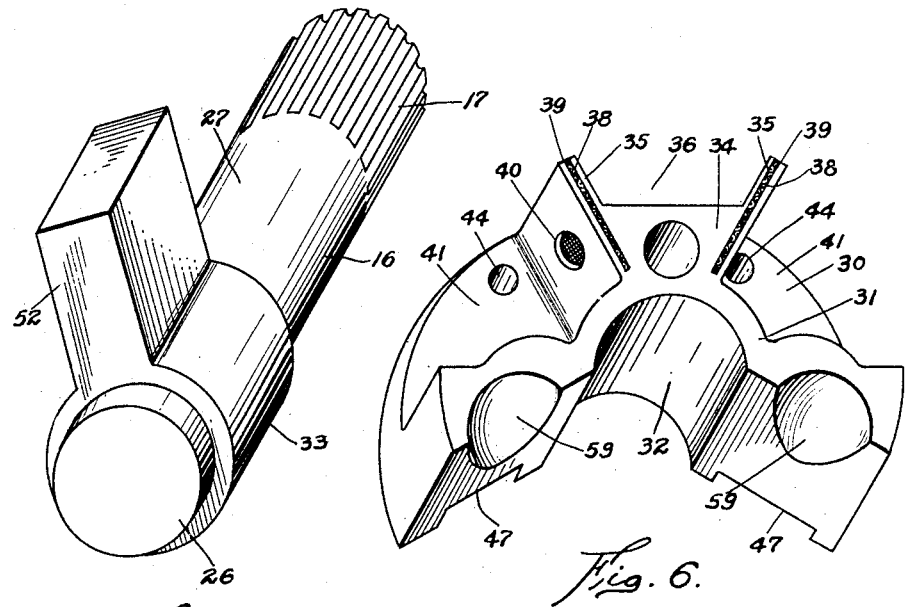
Fig. 6.
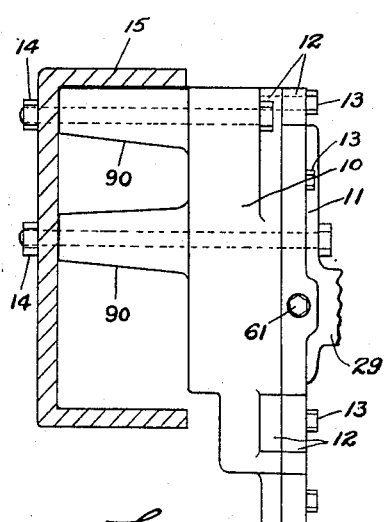
Fig. 8.
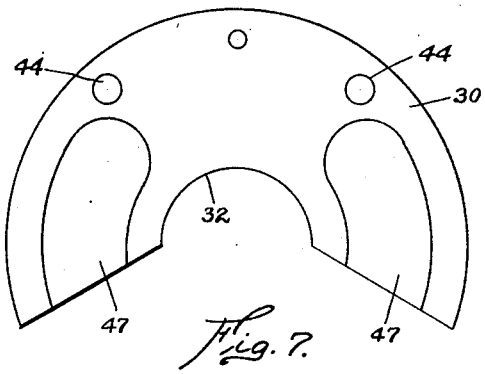
Fig. 7.
Fig. 9.
Inventor
John Eckhard
By Murray and Zugelter
Attorneys Patented June 30, 1931

1,812,519

UNITED STATES PATENT OFFICE

JOHN ECKHARD, OF CINCINNATI, OHIO

FLUID OR HYDRAULIC SHOCK ABSORBER

Application filed October 31, 1929. Serial No. 403,800.

This invention relates to improvements in hydraulic shock absorbers.

An object of the invention is to provide a hydraulic shock absorber having fluid passages and valves arranged in a manner such as will increase the efficiency and sensitivity, and lengthen the life of the shock absorber.

Another object is to provide regulatable means in a shock absorber, for by-passing the fluid therein to preclude bursting of the device when subjected to a shock of excessive force.

Another object is to provide a safety means for precluding injury to the device in the event that it is improperly adjusted.

A further object of the invention is to provide a means for cleansing or filtering the fluid which leaks past the rotary piston shaft, before the return of said fluid into the piston chamber.

Another object is to construct a shock absorber having all valves and passages contained in the housing thereof, the valves being adjustable exteriorly of the device.

Another object of the invention is to provide a form of shock absorber having the advantages of simplicity and low cost of manufacture.

These and other objects are attained by the means described herein and disclosed in the accompanying drawings, in which:

Fig. 3 is a cross-sectional view taken on line 3—3 of Fig. 2.

Fig. 4 is a cross-sectional view taken on line 4—4 of Fig. 2.

Fig. 5 is a cross-sectional view taken on line 5—5 of Fig. 4.

Fig. 6 is an isometric view of a valve cover and partition plate forming a detail of the invention.

Fig. 7 is a rear view of the part shown in Fig. 6.

Fig. 8 is an enlarged isometric view of a rotary piston and shaft forming a detail of the invention.

Fig. 9 is a cross-sectional view similar to Fig. 2 showing a modified form of the device of invention.

Figure 2:
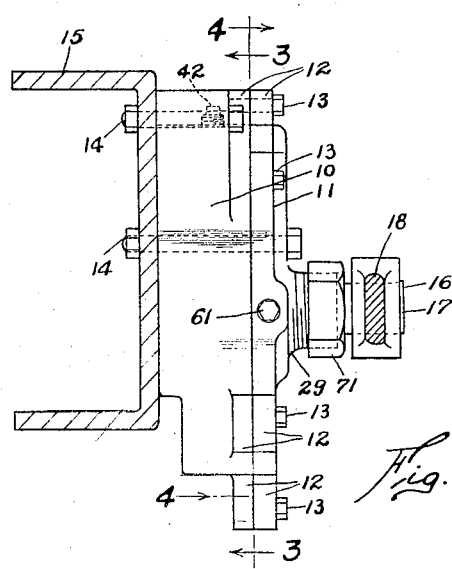
Fig. 2 is a cross-sectional view taken on line 2—2 of Fig. 1.

The fluid or hydraulic shock absorber of the present invention comprises a housing of two parts, namely, the body and cover, indicated by 10 and 11, respectively. A plurality of perforate ears 12 cooperate with bolts 13 for securing the housing members upon one another, as shown in Fig. 2. Shifting of the cover relative to the body is precluded by providing tubular aligning means 130, which fit snugly into enlarged recesses 131 formed in both the cover 11 and body 10, as shown in Figs. 4 and 5. The housing is adapted to receive bolts 14, which serve to secure the device upon a vehicle frame 15. A piston shaft 16, which will be more fully described hereinafter, has one end 17 fluted or otherwise adapted for non-rotative connection to one end of an arm 18, the opposite end of which has a suitable swivel connection with one end of a connecting rod 19. The opposite end of the connecting rod is operatively connected, by any suitable known means, with the spring 20 or axle 21 of the vehicle. From the foregoing, it should be apparent that relative movement of the vehicle spring and frame will be transmitted for rotating the piston shaft 16 of the shock absorber.

As shown in Fig. 3, the body 10 is provided with a cylindrical bore 22 having the smooth curved wall 23 and the back or rear wall 24. A shallow depression 25 in wall 24, forms a bearing for the bearing end 26 (Fig. 8) of the piston shaft. The bearing portion 27 of the shaft is supported in a bearing 28 provided in a boss 29 on the cover (Fig. 5). The piston shaft thereby is supported for rotary movement.

Within the bore 22 of the body, is snugly fitted a substantially semi-circular valve cover plate 30, (Figs. 6, 7 and 3), which is provided with a substantially diametral dividing wall 31 having a semi-circular bearing portion 32 for cooperation with the intermediate bearing 33 of the piston shaft. The body of the plate has a perforated boss 34 through which extends one of the securing bolts 14. Integral with boss 34 is a pair of radially extending partitions 35 which, with the housing of the device, form a filtering chamber 36. The filtering chamber may receive a quantity of porous material 37 suitable for straining and cleaning oil or other fluid. Each partition 35 may be provided with a slot 38 for receiving sheets 39 of mesh material, such as screening, which cover the perforations 40 in the partitions. The perforations 40 provide for fluid communication between the filtering chamber and the adjacent fluid reservoirs 41. As will be explained later, the filter thus provided serves to cleanse the fluid which leaks past the piston shaft and is returned by a fluid passage in the boss 29. The grit and dirt that the fluid accumulates along the shaft, will thereby be removed before being used again in the piston or compression chamber. The filling opening, closed by plug 42, communicates with the filtering chamber, in order to insure the entry of filtered fluid into the device. A plug 43 connecting the plate and housing, serves to preclude shifting of the plate 30 therein.

The valve cover plate 30 is provided with a pair of breather openings 44, which extend through the plate transversely thereof. Each fluid reservoir 41 is in communication with a breather opening 44. For each of said breather openings is provided a passage 45, in the back or rear wall of the body 10. Each passage 45 communicates, at one end thereof, with its respective breather opening 44; the opposite end of each passage 45 terminates in an opening 46 in the body, so as to provide for fluid communication between the compression or piston chamber, and the fluid reservoirs 41. As shown in Figs. 6 and 7, the rear surface of the valve cover plate is provided with recesses 47, each of which cooperates with the wall 24 of the body to provide a valve compartment, by means of which the fluid may pass from the fluid reservoir to the compression chamber. The depressions 47 are sufficiently deep to permit movement of flapper valve members 48, each of which has at one end a valve head 49, for covering its respective breather opening 46. The opposite end 50 of each valve member is secured, as at 51, to the body of the device. From the foregoing, it should be apparent that the valves 49 will permit only one-way movement of the fluid through the passages 45, i. e. when the piston 52 is moved to the right, (Fig. 3) so as to exert fluid pressure upon the right hand valve 49, said valve will close, thereby precluding flow of fluid into the right hand fluid reservoir 41. During such movement of the piston, a vacuum is created at the left of the piston, which causes the valve 49 at the left to open, for admitting fluid into the compression chamber from the left hand fluid reservoir 41.

The provision of the breather valves 49 in the particular manner shown and described herein, is of importance. It will be readily apparent that the enormous pressures created by the piston in the compression or piston chamber 53, are transmitted to the breather valves 49. These valves, therefore, should be heavy enough to withstand such pressures, and at the same time, flexible enough to respond readily when the piston operates to suck the fluid through the valves from the fluid reservoirs. By mounting the breather valves upon the housing, and providing the depressions 47 in the valve cover plate, as disclosed herein, it is possible to make use of comparatively long breather valve members 48, which, of course, are more flexible than short ones. Increasing the length of said members 48 permits of the use therein of a heavier gauge metal, without sacrificing the flexibility of the valve, which is necessary to produce a readily responsive and smooth-acting shock absorber. It should be noted also that the valve cover plate 30 overhangs the breather valves, thereby protecting them from injury in the event that the shock absorber be improperly adjusted to permit the piston 52 to strike the dividing wall 31 of the valve cover plate 30.

Attention is now directed to Figs. 4 and 5 which exemplify the cover 11 of the shock absorber housing. The cover has a flat interior face 54, which cooperates with the body 10, to form the compression chamber 53, filter-chamber 36, and the fluid reservoirs 41. The cover is provided with a plurality of interior passages represented by 55, 56, 57 and 58, which are adapted to permit passage of fluid between the compression chamber and the fluid reservoirs. The openings A and B of the passages 55, 56, 57 and 58, are in communication with their respective fluid reservoirs 41—41, and the openings E are in constant communication with the compression chamber 53 at opposite sides of the piston 52. The depressions 59 in the valve cover plate are provided for the purpose of extending the compression chamber to include the openings E.

In each passage 56 is provided a needle valve 60, whereby the normal flow of fluid through passage 56 may be regulated. The valves extend to a position exteriorly of the cover, so that adjustments thereof may be made at the heads 61 without dismantling the shock absorber. It will be noted that each passage 57 communicates with passage 55, at a point intermediate the openings B and E. A ball valve 62 in each passage 57, serves as a safety valve which is adapted to relieve the pressure in the compression chamber, before such pressure reaches a dangerous limit that would burst the housing of the device. These excessive pressures may be caused by improper adjustment of the shock absorber, or by subjecting the device to shock of unusually great magnitude. The excess pressure thus created causes unseating of the ball valve, which permits fluid flow through the opening A for reducing the pressure in the piston chamber. The minimum pressure which will unseat the valves 62, may be varied by adjusting the force of the valve springs 63 upon the valves 62. Such adjustment may be made exteriorly of the housing by removing the plugs 64 and rotating the threaded adjusting members 65. It is to be understood that suitable means other than those shown herein, may be employed for adjusting the safety and needle valves. Obviously, the safety valves permit flow of fluid only in the direction of the openings A.

Means are provided for trapping and returning fluid leakage which occurs along the piston shaft 16. Said means comprises an annular groove 66, formed in the smooth bore 28 of boss 29, at a location near the end 67 thereof. The groove communicates with a fluid return passage 68 located within the boss. A shallow groove 69, formed in the face 54 of the cover, effects communication between the passage 68 and the filter chamber 36 when the cover is in position upon the body 10. Suitable packing material 70, held in position by the usual packing nut 71, assists in precluding fluid leakage and serves to exclude most of the dirt and grit that accumulates upon the exposed portion of the piston shaft. The packing, however, is inadequate for excluding all dirt and grit, and for this reason, the fluid leakage is directed into the filter chamber. Also, a certain amount of grit is always found on the bearing portion of the shaft, due to wear of the parts. This foreign substance is filtered from the fluid leakage before it has an opportunity to re-enter the piston chamber. It must be apparent that the provision of the filter prolongs the life and increases the efficiency of the shock absorber.

Figure 1:
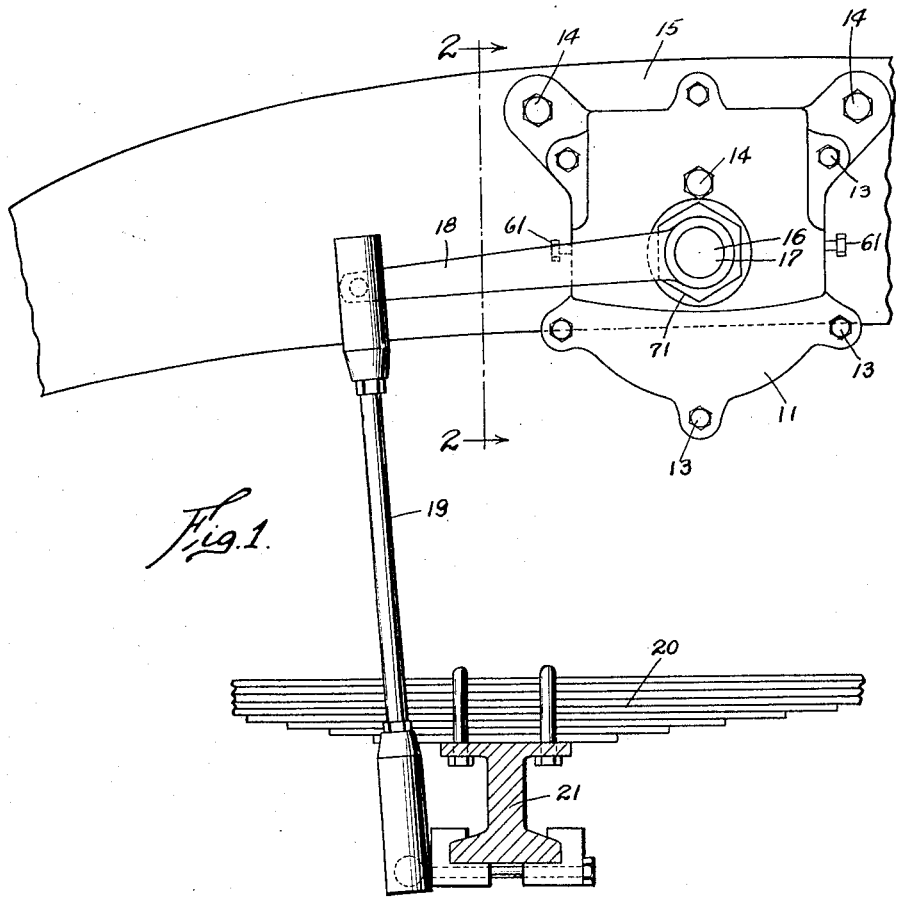
Fig. 1 is a side elevational view showing the device of invention and the manner of operatively connecting it with a vehicle frame and spring supported axle.

The operation of the device is as follows. Reference is made to Fig. 1 which shows the device in a normal position of rest. In the event that the vehicle to which the shock absorber is attached strikes an obstruction which throws the axle 21 upwardly, the connecting rod 19 will transmit the movement so as to rotate the piston shaft in a clockwise direction. Such rotation of the piston shaft causes the piston 52 (Fig. 3) to move to the left, thereby compressing the fluid in the compression chamber to the left of the piston. During said piston movement, the breather valve 49 at the left, which is under fluid pressure, is maintained in a closed position by the fluid pressure, and the fluid is forced through passage 56 from opening E through opening B, whence it is discharged into the corresponding fluid reservoir. The rate of flow through passage 56 is regulated by the needle valve. As the piston thereby displaces the fluid of the compression chamber, a vacuum is created at the opposite side of the piston, which serves to open the other breathing valve for freely admitting fluid to the compartment containing the vacuum. The breathing valves are made large and very sensitive, so that fluid may pass freely when subjected to the vacuum produced in the piston chamber. When the shock is in a direction such as will cause the piston to move in counter-clockwise direction, the fluid flow is reversed and passes through the other set of corresponding valves and passages, as should be readily understood.

In the event that the shock transmitted to the piston is of great magnitude, one of the automatic safety valves 62 will function to by-pass the fluid from the compression chamber to the fluid reservoir for relieving the excessive pressure therein. The pressure required to unseat the valves 62 may be regulated by the threaded plug 65, as was explained before.

It should be apparent from the foregoing, that a shock absorber constructed in accordance with the invention disclosed herein, will respond readily to shocks of all magnitudes, and that very accurate adjustments relative thereto may be conveniently made without dismantling the device. Injury to the parts is precluded by providing the filter, which removes all particles of abrasive or other foreign materials, and by providing the safety valves which relieve excess or bursting pressure that may result from tampering with or improperly adjusting the needle valves. The arrangement of breathing valves disclosed herein permits the use of a durable, inexpensive valve construction without sacrificing flexibility of action.

In Fig. 9 is shown a modified form of housing body, for use where it is necessary to install the shock absorber on the inside of the channel frame member 15. Under such circumstances, the rear face of the housing body is provided with bored spacer members 90 through which the three bolts 14 may extend. The spacer members preferably are cast integrally with the body, thereby providing a rigid three point suspension means, which prevents distortion of the body that would ordinarily result from securing four or more points of the body to a frame member which is inaccurately shaped.

It is to be understood that various modifications and changes in structural details of the device may be made within the scope of the claims, without departing from the spirit of the invention.

What is claimed is:

1. In a fluid shock absorber of the class described, the combination of a housing having a cavity therein for containing a fluid said housing being provided with fluid passages, means disposed within the cavity of the housing for dividing the cavity into a piston chamber and a fluid reservoir having fluid communication through the passages of the housing, a bored boss on the housing having an annular fluid collecting groove and a communicating channel, a filter in the housing in which said communicating channel terminates for conveying fluid from the collecting groove to the filter, a piston shaft extending through the bore in the boss, a piston on the shaft disposed within the piston chamber, said piston being actuatable for creating pressure in the piston chamber for displacing fluid through the passages of the housing into and from the fluid reservoir, said pressure serving also to force fluid into the filter by way of the collecting groove and its communicating channels.

2. In a fluid shock absorber of the class described, the combination of a housing having a cavity therein for containing a fluid, means disposed within the cavity of the housing for dividing said cavity into a piston chamber and a fluid reservoir, a bored boss on the housing having a fluid collecting groove and a fluid conveying channel, a filter having communication with the collecting groove through the fluid conveying channel, an actuatable piston shaft extending through the bore of the boss, a piston on said shaft disposed within the piston chamber for creating fluid pressure in the piston chamber and the bore of the boss, the resultant fluid leakage through the bore of the boss being driven by the fluid pressure into the filter.

3. In a fluid shock absorber of the class described, the combination of a housing having a cavity therein for containing a fluid, said housing being provided with fluid passages, means disposed within the cavity of the housing for dividing the cavity into a piston chamber and a fluid reservoir having fluid communication through the passages of the housing, an operable rotary piston in the piston chamber for moving the fluid through the passages, piston chamber and the fluid reservoir, and means for filtering said fluid during movement of the piston.

4. In a fluid shock absorber of the class described, the combination of a hollow housing having a bore provided with a fluid collecting groove and a fluid return channel, said housing being adapted to contain a fluid, a filter having communication with the fluid collecting groove through said return channel, a piston shaft extending through the bore in the housing, means associated with the piston shaft and the housing for creating pressure within the housing, said pressure serving to force fluid leakage into the bore to the collecting groove, and through the return channel to the filter.

5. In a fluid shock absorber of the class described, the combination of a hollow housing having a pair of constricted fluid passages, a pair of breathing passages, and a pair of pressure relief passages formed therein, diametral means in the housing for dividing the interior thereof into a piston chamber and a fluid reservoir, the chamber and reservoir being in communication through the pairs of passages, means adjustable exteriorly of the housing and cooperating with the constricted passages for regulating flow of fluid therethrough, a pressure operated valve in each fluid pressure relief passage, means accessible from the exterior of the housing for adjusting said pressure operated valves, and an actuatable piston working within the piston chamber for creating fluid pressure within the piston chamber, the constricted fluid passages, and the pressure relief passages.

6. In a fluid shock absorber of the class described, the combination of a hollow housing having a piston shaft bore and a plurality of passages for conveying fluid, diametral means within the housing for dividing the interior thereof into a piston chamber and a fluid reservoir, the passages in the housing being disposed for effecting communication between the piston chamber and the fluid reservoir, flapper type valves for normally closing certain of the passages in the housing, valves in the housing for controlling fluid flow through the remaining passages in the housing, a piston shaft extending through the piston shaft bore and a piston on the shaft for operation within the piston chamber.

7. In a fluid shock absorber of the class described, the combination of a hollow housing having a pair of constricted fluid passages and a pair of breathing passages formed therein, diametral means in the housing for dividing the interior thereof into a piston chamber and a fluid reservoir, the chamber and reservoir being in communication through the constricted fluid passages and the breathing passages, means adjustable exteriorly of the housing and cooperating with the constricted passages for regulating fluid flow through said passages, and an actuatable piston working within the piston chamber for effecting flow of fluid through the passages.

8. In a fluid shock absorber of the class described, the combination of a hollow housing having a bore and fluid openings therein, means in the housing for dividing the interior thereof into a piston chamber and a fluid reservoir, said means having depressions therein, flapper type breathing valves closing the fluid openings and disposed interiorly of the housing said valves being covered by the first mentioned means, the depressions in said means being arranged to receive the valves, a piston shaft extending through the bore of the housing, and a piston on the shaft for operation within the piston chamber.

9. A cover for a fluid shock absorber body, said cover being provided with a pair of constricted fluid passages and a pair of fluid pressure relief passages all of which emerge to the inner face of the cover, means extending into each of the constricted fluid passages for regulating the capacity of said passages, a spring controlled check valve in each fluid pressure relief passage, and means for adjusting the resistance of each spring controlled check valve.

10. In a fluid shock absorber of the class described, the combination of a body having a cavity divided into a compression chamber and a fluid reservoir, a cover for the body said cover being provided with a constricted fluid passage and a fluid pressure relief passage, the outlet ends of the constricted fluid passage being in communication with the compression chamber and the fluid reservoir, and the outlet ends of the fluid pressure relief passage being in communication with the fluid reservoir and the constricted passage outlet which terminates in the compression chamber, a check valve in the fluid pressure relief passage, an adjustable valve extending into the constricted passage and arranged to control fluid flow therethrough but permitting constant free and unconstricted communication of the fluid pressure relief passage with the compression chamber, and actuatable means for creating fluid pressure in the compression chamber for inducing flow of fluid through the passages.

11. In a fluid shock absorber of the class described, the combination of a hollow housing having a constricted fluid passage, a fluid pressure relief passage and a breather passage, means dividing the interior of the housing into a compression chamber and a fluid reservoir having communication with one another by way of each of said passages, and a manually adjustable valve cooperating with the constricted fluid passage and the pressure relief passage whereby communication may be cut off between the compression chamber and the fluid reservoir through the constricted fluid passage without cutting off communication through the pressure relief passage, and actuatable means for creating fluid pressure in the compression chamber for inducing flow of fluid through the passages.

12. In a fluid shock absorber of the class described, the combination with a hollow housing having fluid passages formed therein, of a plate adapted for disposition within the housing, a diametral dividing wall on the plate for dividing the interior of the housing into a compression chamber and a fluid reservoir, a pair of spaced slotted perforate walls in the fluid reservoir, the slot of each wall being disposed transversely of its respective perforation, screening material in each slot for screening substance passing through the perforations, filtering material between the walls, and means operating in the pressure chamber for circulating fluid through the fluid passages of the housing and through the filtering material and screens associated with the spaced walls.

13. In a shock absorber, the combination of a hollow housing consisting of a perforate body having a cavity, and a perforate cover therefor, a dividing member in the cavity, said dividing member having a bore for registration with the perforations of the body and cover, a bored spacer member extending from the body in alignment with the bore of the dividing member and the perforations of the body and cover, a securing means for attaching the housing to a support, said securing means passing through the perforations of the cover and body and the bores in the spacer and dividing members, the securing means serving to secure the cover upon the dividing member and to preclude shifting of the dividing member relative to the cover and body.

14. In a shock absorber, the combination of a hollow housing for attachment to a vehicle frame, means within the housing comprising a dividing wall for the interior of the housing, said means being provided with a transverse bore, and a fastening means extending through the frame, the housing and the transverse bore of the above mentioned means, for securing the housing upon the frame and precluding shifting of said means within the hollow housing.

15. In a shock absorber, the combination of a housing consisting of a perforate body and a perforate cover adapted to close the body, said perforations being arranged to register with one another, a tubular member secured in one of the perforations and adapted to extend into the cooperative perforation for alignment of the cover and body, and a securing means passing through the tubular member.

In testimony whereof, I have hereunto subscribed my name this 30th day of October, 1929.

JOHN ECKHARD.